(No Model.) 2 Sheets—Sheet 1.
S. D. CROCKETT.
THRASHING MACHINE.
No. 513,089. Patented Jan. 23, 1894.
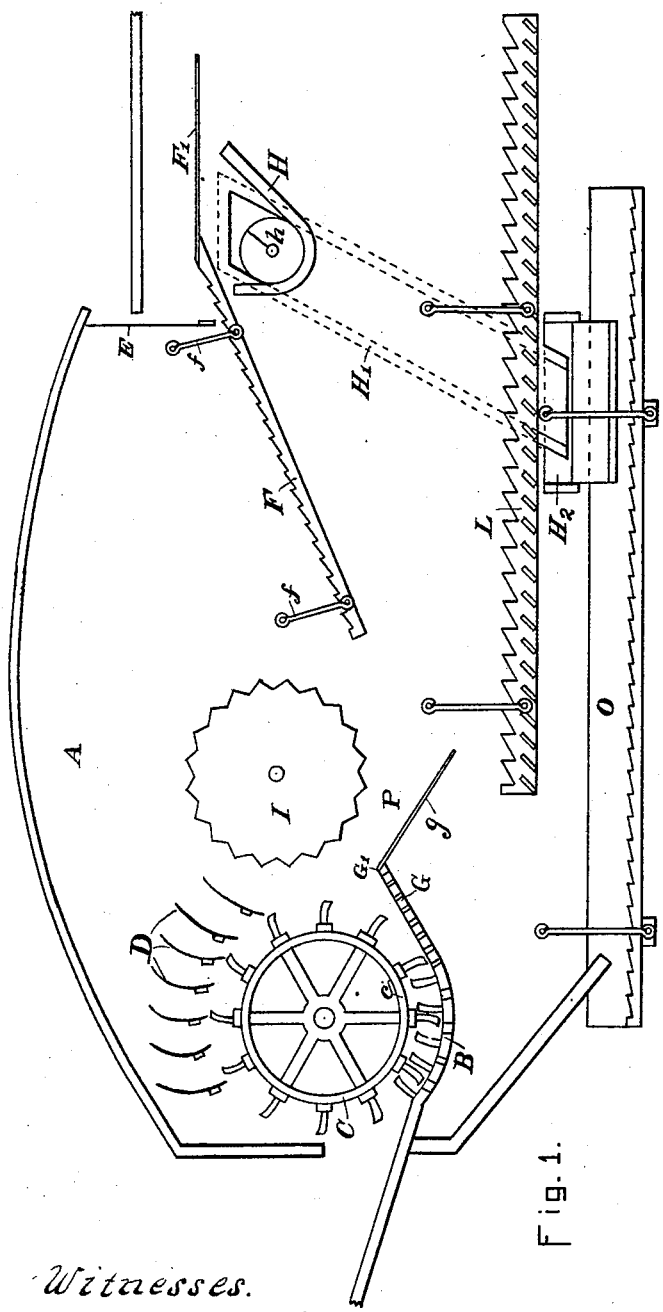
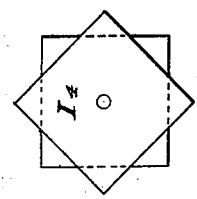
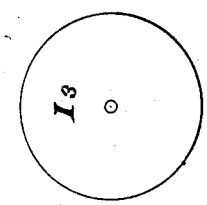
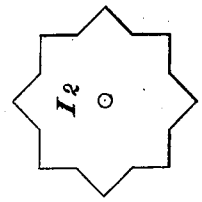
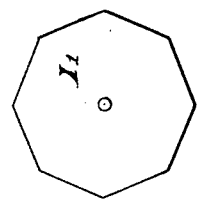
Witnesses.
A. R. Carpenter
F. E. Adams
Inventor.
S. D. Crockett
by H. L. Reynolds
his atty

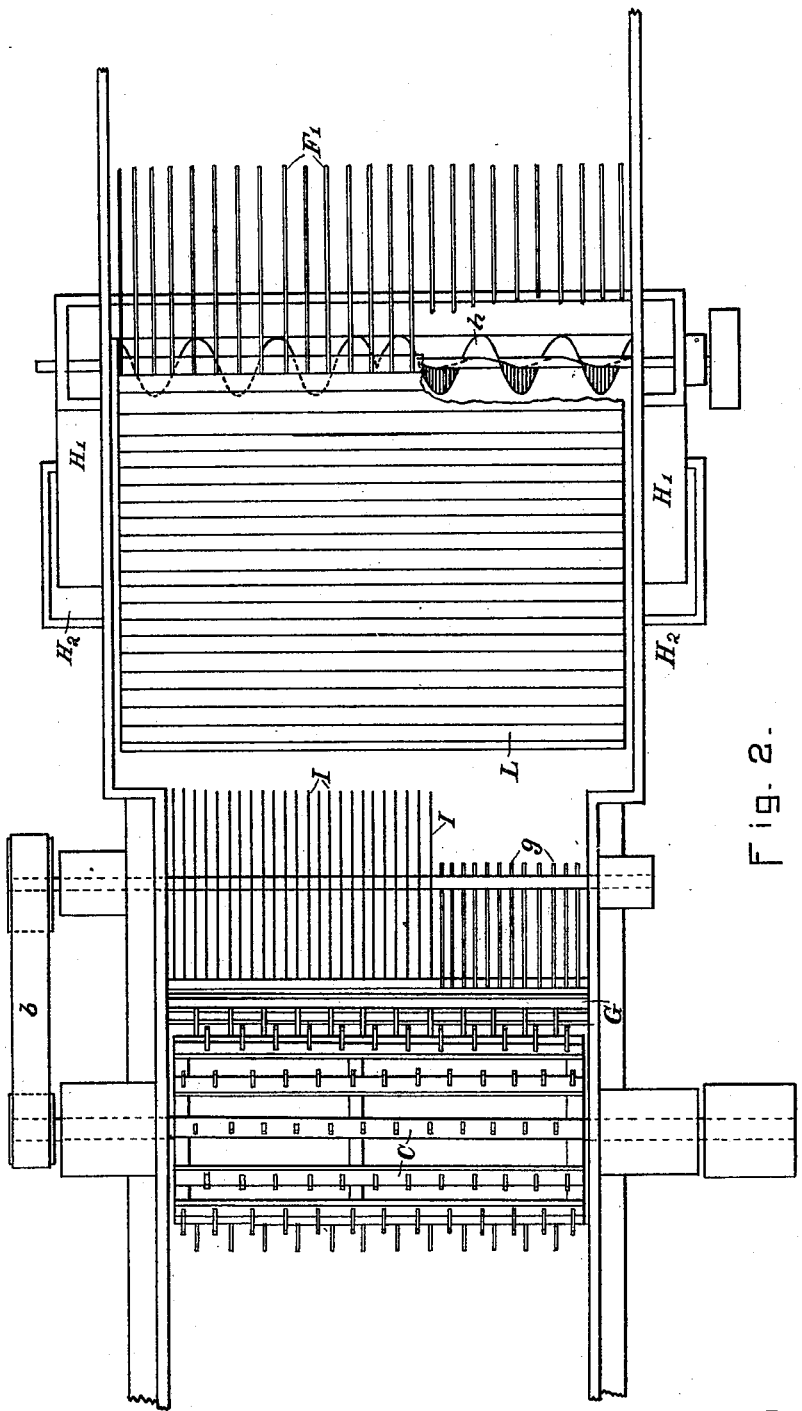

UNITED STATES PATENT OFFICE.

SAMUEL D. CROCKETT, OF SEATTLE, WASHINGTON.

THRASHING-MACHINE.

SPECIFICATION forming part of Letters Patent No. 513,089, dated January 23, 1894.

Application filed June 19, 1893. Serial No. 478,194. (No model.)

*To all whom it may concern:*

Be it known that I, SAMUEL D. CROCKETT, a citizen of the United States, residing at Seattle, in the county of King and State of Washington, have invented certain new and useful Improvements in Thrashing-Machines; and I do hereby declare the following to be a full, clear, and exact description of the invention, such as will enable others skilled in the art to which it appertains to make and use the same.

My invention consists of certain devices for the more thorough separation of the grain from the straw and chaff in thrashing machines, whereby the separating capacity of the machine is much increased.

It consists essentially of a device placed in the path of the straw as it leaves the thrashing cylinder which will intercept and change the direction of the straw but will permit the grain to pass through, and of means placed beyond these intercepting means for catching the grain and delivering it to the cleaning mechanism.

It consists also of certain deflecting plates placed about the cylinder in such a manner as to catch the flying grain and deflect it toward certain receiving devices which will deliver it to the cleaning mechanism.

The object sought for by me is to catch all the grain possible as it flies from the cylinder and not permit it to fall back again into the straw.

Figure 1 shows an elevation of certain portions of a thrashing machine containing my devices the side being removed to show the interior. Fig. 2, is a plan view of the same. Figs. 3 to 6, inclusive, are different forms of disks which may be used instead of that shown in Fig. 1.

In the drawings C, represents the ordinary form of thrashing machine cylinder, B, the concave, and G, the grating behind the concave. This grating is carried up at such an angle as to direct the straw and grain upon the intercepting disks I. These intercepters consist of a series of thin metal disks placed close together upon a shaft and revolving in the same direction as the cylinder. These may be made of any of the forms shown but preferably with a notched or irregular edge so that they will act somewhat as beaters and keep the straw moving backward.

The openings in the concave B, and the grating G, permit a portion of the grain which has been thrashed out to drop through where it is caught by mechanism which conveys it to the cleaning mechanism. The mixed grain and straw is then dashed violently against the intercepting disk I. These being composed of thin metal disks permit the grain to pass between them, where it is caught by the grain shoe F, but force the straw downward through the space P, and upon the vibrating carrier and separator L, from which point it is acted upon by the usual separating and moving mechanism.

The chute, $g$, which consists of a series of rods attached to the grating at G', receives the straw as it is dashed from the revolving disks I, and assists in the separation of the grain which may be carried along with it. The vibrating carrier L, and the grain carrier O, are not novel, but such as are ordinarily used in thrashing machines and will not be particularly described. The other mechanism common to a thrashing machine but which has no direct connection with my invention, has been omitted.

Placed above the upper portion of the cylinder are the deflectors D. These consist of plates of sheet metal, preferably curved as shown, although flat plates may be used, which extend lengthwise of the cylinder and as close thereto as may be without danger of clogging by straws which may be carried around by the cylinder. The grain which has been carried around by the cylinder and thrown out in this direction is deflected by these plates back upon the shoe F. The chamber A, has its roof made in a curved form so that any grain thrown by the cylinder and striking it will be deflected to the same point. This has been made in a curved form as it will in this form most effectually deflect the flying grain upon the shoe F, or whatever other device may be used to catch this grain. It will however in a measure accomplish the same purpose if made straight.

The shoe F, is a flat board having its upper surface notched, and swinging upon the rods $f$. The grain falling upon it will be carried to the upper end and delivered into the trough H. To the upper end of the shoe F, is fixed a screw F', consisting of a series of rods which extend over the trough H, and prevent straws from dropping therein. The lower edge of the cylinder as at c, the upper end of the grating as at G', the disks I, and the lower end of the shoe F, are so placed relative to each other that a line through c, and G', will pass within the lower edge of the disk I, and above the lower end of the shoe F. This is to insure that the straw and grain will all strike the disks I, and that the grain which passes through will be caught by the shoe F.

The rear end of the chamber A, is closed by a hanging canvas curtain E. This is used in order that access may be readily had to this chamber and because grain striking the canvas would be less likely to rebound than if wood were used. The trough H, has within it a worm $h$, which is built with a right and left pitch and conveys the grain each way from the center, and delivers it to the spouts H', at the sides which deliver it to the boxes H², which are carried by the swinging shaker O. This shaker O, is a part of the ordinary cleaning mechanism. Instead of the shoe F, may be substituted any mechanism as an endless belt which will catch the grain and deliver it to the cleaning mechanism.

Having thus described my invention, what I claim, and desire to secure by Letters Patent, is—

1. In a thrashing machine the combination with the cylinder, of an intercepting device located in the path of the straw and grain as it leaves the cylinder, said device consisting of a revolving shaft carrying a series of thin metal disks spaced thereon a short distance from each other, whereby the straw is intercepted and forced in another direction and the grain is permitted to pass through, and a device for catching said grain, substantially as shown and described.

2. In a thrashing machine the combination with the cylinder, of a rotating shaft located just back of the cylinder and carrying a series of metal disks having irregular edges, and a grain catching device just back of this, substantially as shown and described.

3. In a thrashing machine the combination of the cylinder C, concave B, and grating G, intercepters I, and shoe F, said parts being so placed in relation to each other that a line drawn from the lower side of the cylinder and over the grating will pass above the lower edges of both the intercepters and the shoe F, substantially as shown and described.

4. In a thrashing machine the combination with the cylinder, of a series of deflector plates located above the upper portion of the cylinder, and a chamber A, said plates being so placed as to receive the flying grain and deflect it into the said chamber, substantially as shown and described.

5. In a thrashing machine the combination with the cylinder, of a series of curved deflector plates located above the upper portion of the cylinder, the chamber A, said plates being so placed as to catch the flying grain and deflect it to the rear of said chamber, and a device at the rear of said chamber for catching and removing said grain, substantially as shown and described.

6. In a thrashing machine the combination with the cylinder, and its complemental thrashing and cleaning mechanism, of the deflector plates D, chamber A, grain shoe F, at the rear of said chamber, conveyer $h$, and spouts or chutes leading therefrom to the grain cleaning mechanism substantially as shown and described.

7. In a thrashing machine the combination with the thrashing mechanism and a rotating shaft carrying a series of thin metal plates having irregular edges, of the chute so placed as to receive the straw as it leaves the rotating disks, substantially as shown and described.

8. In a thrashing machine the combination with the cylinder and the complemental thrashing mechanisms, of a rotating shaft carrying a series of thin disks placed in the path of the flying straw and grain and separated a short distance from each other, deflector plates above the cylinder, chamber A, vibrating grain shoe F, so placed as to catch the grain passing between the revolving disks and that deflected from the plates, and means for conveying said grain to the cleaning mechanism, substantially as shown and described.

In testimony whereof I affix my signature in presence of two witnesses.

SAMUEL D. CROCKETT.

Witnesses:
L. H. WHEELER,
H. L. REYNOLDS.